US010641377B2

(12) United States Patent
Frey et al.

(10) Patent No.: US 10,641,377 B2
(45) Date of Patent: May 5, 2020

(54) COMPACT MULTI-STAGE GEAR WITH A PLANETARY GEAR AND A STRAIN WAVE GEAR ADJACENT TO SAID MULTI-STAGE GEAR

(71) Applicant: Lakeview Innovation Ltd., Buochs (CH)

(72) Inventors: Dominik Frey, Denzlingen (DE); Marco Schelb, Freiburg (DE); Alexander Rissler, Sexau (DE)

(73) Assignee: LAKEVIEW INNOVATION LTD., Buochs (CH)

(*) Notice: Subject to any disclaimer, the term of this patent is extended or adjusted under 35 U.S.C. 154(b) by 355 days.

(21) Appl. No.: 15/872,924

(22) Filed: Jan. 16, 2018

(65) Prior Publication Data

US 2018/0209529 A1 Jul. 26, 2018

(30) Foreign Application Priority Data

Jan. 24, 2017 (EP) .................................... 17152884

(51) Int. Cl.

| | |
|---|---|
| ***F16H 49/00*** | (2006.01) |
| ***F16H 1/28*** | (2006.01) |
| ***F16H 37/00*** | (2006.01) |
| ***F16H 1/32*** | (2006.01) |
| ***F16H 1/46*** | (2006.01) |
| ***F16H 37/04*** | (2006.01) |

(52) U.S. Cl.

CPC ......... *F16H 49/001* (2013.01); *F16H 1/2863* (2013.01); *F16H 1/32* (2013.01); *F16H 37/00* (2013.01); *F16H 1/46* (2013.01); *F16H 37/041* (2013.01); *F16H 2001/327* (2013.01)

(58) Field of Classification Search

CPC ................................................ F16H 2001/327

See application file for complete search history.

(56) References Cited

U.S. PATENT DOCUMENTS

| | | | | |
|---|---|---|---|---|
| 3,172,299 A * | 3/1965 | Walton | B62D 3/02 | 74/388 PS |
| 4,003,272 A * | 1/1977 | Volkov | F16H 49/001 | 74/640 |
| 7,118,506 B2 * | 10/2006 | Zheng | B62D 5/008 | 475/18 |
| 2001/0052735 A1 * | 12/2001 | Sakamoto | F16M 11/18 | 310/75 R |
| 2010/0072725 A1 * | 3/2010 | Woellhaf | B60G 21/0555 | 280/124.107 |

FOREIGN PATENT DOCUMENTS

| | | |
|---|---|---|
| CN | 2043692 U | 8/1989 |
| DE | 10151878 A1 | 5/2003 |
| DE | 10333951 B3 | 11/2004 |
| WO | 2015139915 A1 | 9/2015 |

* cited by examiner

*Primary Examiner* — Terence Boes

(74) *Attorney, Agent, or Firm* — Baker & Hostetler LLP

(57) ABSTRACT

A multi-stage gear is provided with a planetary gear and a strain wave gear adjacent to the multi-stage gear, wherein a output of the planetary gear maintains a drive connection with a wave generator of the strain wave gear, and wherein the planetary gear is arranged at least partially radially within the strain wave gear. It is provided that the wave generator is mounted radially on a ring gear of the planetary gear.

10 Claims, 1 Drawing Sheet

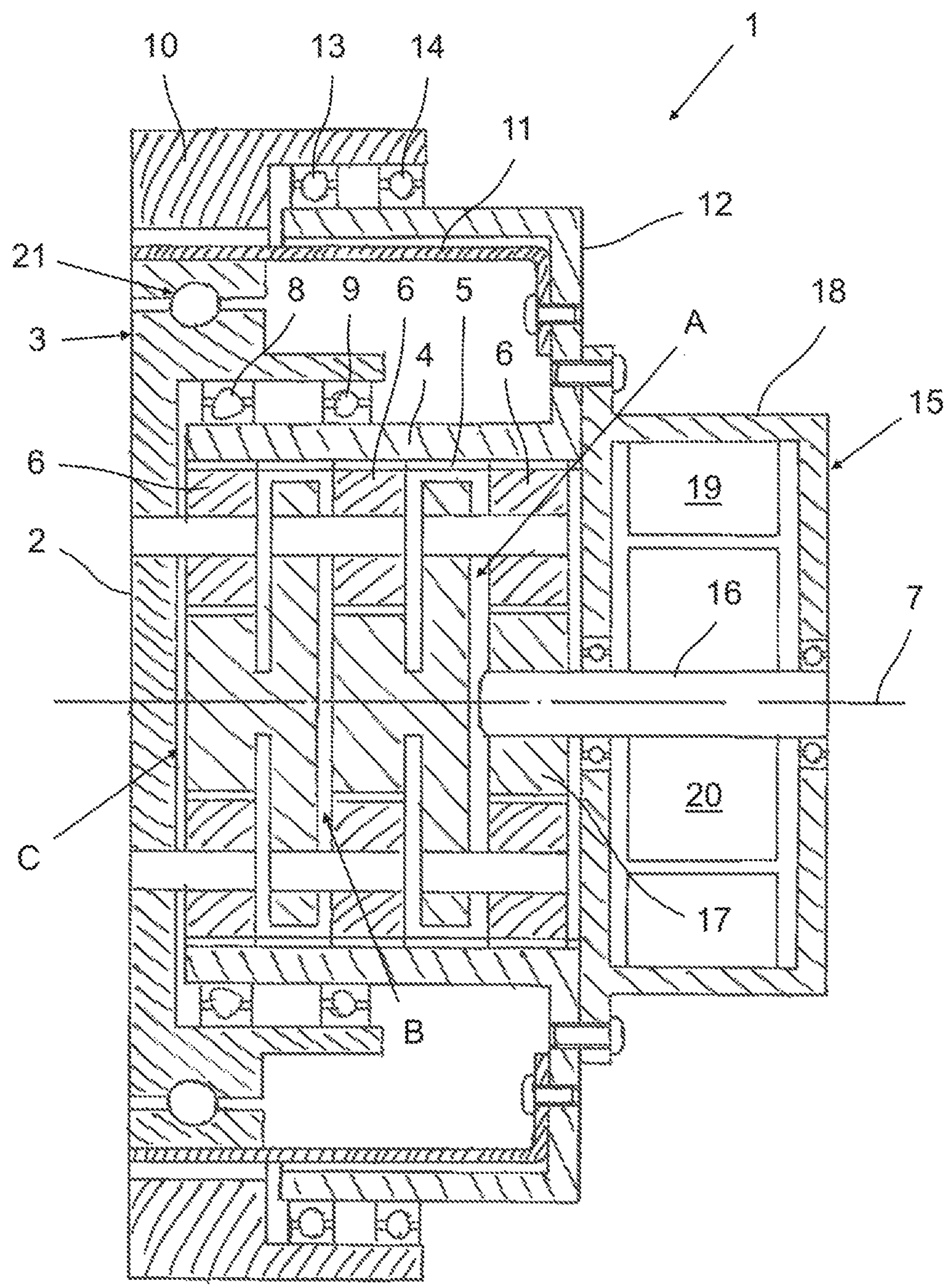
1
10
13
14
11
12
21
8
9
6
5
A
18
3
4
6
15
6
19
2
16
7
C
20
17
B

COMPACT MULTI-STAGE GEAR WITH A PLANETARY GEAR AND A STRAIN WAVE GEAR ADJACENT TO SAID MULTI-STAGE GEAR

CROSS-REFERENCE TO RELATED APPLICATION

This application claims priority to foreign European patent application No. EP 17152884.7, filed on Jan. 24, 2017, the disclosure of which is incorporated by reference in its entirety.

FIELD OF THE INVENTION

The present invention relates to a multi-stage gear with a planetary gear and a strain wave gear adjacent to and/or downstream of said multi-stage gear according to the generic term of the independent Claim 1.

BACKGROUND

In such a multi-stage gear, an output of the planetary gear stands in a drive connection with a wave generator of the strain wave gear. The planetary gear is arranged at least partially in a radial way within the strain wave gear.

Multi-stage gears of the category-specific type offer the advantage of a very short axial structural length while the gear has zero backlash. Pure planetary gears, however, are usually not free of backlash. Through the combination of a planetary gear with a strain wave gear, high gear reduction conditions can be achieved and high angular torques can be created. Such gears are particularly interesting for drives in the field of wheel drives and robotic applications, where both freedom of backlash as well as a high angular torque are required.

A multi-stage gear according to the generic term of the independent Claim 1 is described for example in DE 10333951 B3. In this gear, a single-stage planetary gear is used, whose planetary wheels mesh on one hand with the sun wheel and on the other hand support themselves on an internal, externally toothed support disc. The wave generator of the strain wave gear is supported exclusively on the single planetary carrier of the planetary gear.

A further multi-stage gear according to the generic term of the independent Claim 1 is known from DE 10151878 A1. Also in this gear, the wave generator of the strain wave gear is supported exclusively on the single planetary carrier of the planetary gear. The planetary wheels of the planetary gear mesh with the sun wheel and an internally toothed ring gear that is, when viewed in an axial direction, arranged next to the strain wave gear so that the overall structure of this gear is not quite as compact as in the drive from DE 10333951 B3.

SUMMARY OF THE INVENTION

The purpose of the present invention is to indicate a multi-stage gear with a planetary gear and a strain wave gear adjacent to said multi-stage gear, which is in particular in the axial direction particularly compact, low-wear, intrinsically stable and at the same time suitable to absorb high tilting torques around an axis that is perpendicular to the longitudinal axis of the gear.

The problem is solved by the features of the independent Claim 1. According to said features, a solution of the problem according to the invention exists in a multi-stage gear according to the generic term of Claim 1 when the wave generator is installed radially on a ring gear of the planetary gear. The ring gear preferably has an internal teething. Further preferably, planetary wheels of the planetary gear mesh with the internal teething of the ring gear. Further preferably, the ring gear forms a bearing of the planetary gear as it is the case in conventional planetary gears. During construction of the multi-stage gear according to the invention, recourse can therefore be made to standard planetary drives that only have to be modified in a minor way where required. The planetary gear and the strain wave gear have the same longitudinal axis in the gear according to the invention.

Preferred embodiments of the present invention are the object of the sub-claims.

According to a particularly preferred embodiment of the present invention, the output of the planetary gear is a planetary carrier of the planetary gear, wherein this planetary carrier is defined as one part with the wave generator. Therefore, a particularly compact integration of the planetary gear in the strain wave gear becomes possible. Further, the number of the required components is reduced this way, which, in turn, lowers the manufacturing workload and the respective costs.

According to a further particularly preferred embodiment of the present invention, the wave generator is installed with at least one roller bearing on the ring gear of the planetary gear. Therefore, the multi-stage gear according to the invention becomes particularly stable and low-wear. In this, it is particularly preferable for the wave generator to be installed with two roller bearings, which are axially spaced from one another, on the ring gear of the planetary gear. Further preferably, the roller bearing or the roller bearings are ball bearings. Further preferably, the roller bearings are arranged on the axial ends of the wave generator, which leads to a particularly stable and low-wear mounting. In this context, it is particularly advantageous if the effective axial distance between the two roller bearing amounts at least to half of the axial overlap of the wave generator and the ring gear. Further preferably, the effective axial distance between the two roller bearings amounts to at least 70% of the axial overlap of the wave generator and the ring gear.

According to a further embodiment of the present invention, the planetary gear is defined in a multi-stage way, wherein the wave generator encloses the ring gear of the planetary gear over a maximum of half of the axial length of the ring gear. This constitutes a good compromise between stable mounting and a light structural design.

According to an alternative embodiment of the present invention, the planetary gear is designed in a single-stage way, wherein the wave generator encloses the ring gear over the whole axial length of the ring gear.

According to a further preferred embodiment of the present invention, the axial overlap of the planetary gear and the strain wave gear amounts to at least 80% of the axial length of the planetary gear. This leads to a compact structural design. Particularly preferably, the planetary drive is enclosed over its complete axial length by the strain wave gear.

Further preferably, an external ring gear of the strain wave gear, which is equipped with an internal teething, forms the output of the multi-stage gear. Therefore, particularly high angular torques can be transmitted. In this, the flexspline of the strain wave gear, which is arranged between the wave generator and the external ring gear of the strain wave gear, is fixed. It can for example be firmly connected to the ring gear of the planetary gear. Alternatively, also the flexspline of the strain wave gear can form the output. In this, the external ring gear of the strain wave gear is formed in a fixed way. Particularly preferably, the strain wave gear is a harmonic drive gear.

The present invention also provides a drive unit with a multi-stage gear according to the invention and an electric motor. In this, the planetary gear is driven by the electric motor, wherein the electric motor is preferably designed as an internal rotor motor.

BRIEF DESCRIPTION OF THE DRAWINGS

An embodiment of the present invention will be described in greater detail based on a drawing in the following.

FIG. 1 shows a longitudinal section through an embodiment of a drive unit 1 according to the invention with an electric motor 15 and a multi-stage gear according to the invention. The multi-stage gear consists of a three-stage planetary gear and a downstream strain wave gear. The planetary gear is arranged radially within the strain wave gear. The planetary gear and the strain wave gear share a common longitudinal axis 7. The planetary gear is driven by the electric motor 15. The electric motor 15 is an internal rotor motor. It therefore has an external stator 19, which is connected firmly to the bearing 18 of the electric motor, and an internal rotor 20. The rotor 20 comprises the motor shaft 16 that protrudes from the bearing 18 of the electric motor in the illustration on the left side and whose end carries the input sun wheel 17 of the first stage A of the three-stage planetary gear. Each of the three planetary stages A, B and C consists of a respective sun wheel, a planetary carrier as well as planetary wheels 6 that are mounted in a rotatable way on said planetary carrier and that mesh on one hand with the respective sun wheel of the corresponding planetary stage and on the other hand with the internal teething 5 of an external ring gear 4 of the planetary gear.

DETAILED DESCRIPTION

The planetary carrier 2 of the last planetary stage C forms the output of the three-stage planetary gear. It is formed as one part with the wave generator 3 of the downstream strain wave gear. Said strain wave gear, in turn, is installed radially on the ring gear 4 of the planetary gear with two ball drives 8 and 9 that are spaced axially from one another. As becomes clear from the drawing, the wave generator 3 encloses the ring gear 4 approximately over half of the axial length of the ring gear 4. The two ball bearings 8 and 9 are positioned in such a way that they are arranged essentially on the opposite ends of the wave generator 3.

The wave generator 3 has a well-known elliptic form and causes during a rotation a circulating deformation of the external flexible spur gear 11 of the strain wave gear. Between the wave generator 3 and the flexspline 11, a respective roller bearing 21 is arranged in the known way. In the shown embodiment, the flexspline 11 is connected in a torque-proof way with the ring gear 4 of the planetary gear. For this purpose, it can for example be screwed with an extension 12 of the ring gear 4, which, however, cannot be counted as part of the planetary gear but which is part of the external strain wave gear. Here, also a separate component can be used instead of an extension of the ring gear 4.

The flexspline 11 has an external teething that, during rotation of the wave generator, is set to encroach with an internal teething of the external ring gear 10 of the strain wave gear in a sectionally circulating way. The ring gear 10 forms the output of the multi-stage gear according to the invention. It is installed flexibly on the extension 12 of the ring gear 4 of the planetary gear by means of two ball bearings 13 and 14. In a similar way as the two ball bearings 8 and 9, the two ball bearings 13 and 14 are arranged in a spaced way from one another in order to ensure a particularly stable mounting of the ring gear 10.

The invention claimed is:

1. A multi-stage gear with a planetary gear and a strain wave gear adjacent to said planetary gear, wherein a drive of the planetary gear maintains a drive connection with a wave generator of the strain wave gear, and wherein the planetary gear is arranged at least partially radially within the strain wave gear, wherein the wave generator is mounted radially on a ring gear of the planetary gear.

2. The multi-stage gear according to claim 1, wherein the output of the planetary gear is a planetary carrier of the planetary gear, wherein this planetary carrier is formed as one part with the wave generator.

3. The multi-stage gear according to claim 1, wherein the wave generator is mounted with at least one roller bearing on the ring gear of the planetary gear.

4. The multi-stage gear according to claim 3, wherein the wave generator is mounted on the ring gear of the planetary gear with two roller bearings that are axially spaced from one another.

5. The multi-stage gear according to claim 4, wherein the effective axial distance between the two roller bearings amounts to at least half of the axial overlap of the wave generator and the ring gear.

6. The multi-stage gear according to claim 1, wherein the planetary gear is formed in a multi-stage way, wherein the wave generator encloses the ring gear over a maximum of half of the axial length of the ring gear.

7. The multi-stage gear according to claim 1, wherein the planetary gear is formed in a single-stage way, wherein the wave generator encloses the ring gear over the entire axial length of the ring gear.

8. The multi-stage gear according to claim 1, wherein the axial overlap of the planetary gear and the strain wave gear amounts to at least 80% of the axial length of the planetary gear.

9. The multi-stage strain wave gear according to claim 8, wherein the planetary gear is enclosed over its entire axial length by the strain wave gear.

10. A drive unit with a multi-stage gear according to claim 1, wherein the gear unit has an electric motor, wherein the planetary gear is driven by the electric motor, and wherein the electric motor is an internal rotor motor.

* * * * *